(12) United States Patent
Zhang et al.

(10) Patent No.: US 12,126,947 B2
(45) Date of Patent: Oct. 22, 2024

(54) METHOD, DEVICE AND COMPUTER READABLE STORAGE MEDIUM IMPLEMENTED IN AN OPTICAL NETWORK

(71) Applicant: Nokia Solutions and Networks Oy, Espoo (FI)

(72) Inventors: Dongxu Zhang, Shanghai (CN); Chenhui Ye, Shanghai (CN); Dan Geng, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 146 days.

(21) Appl. No.: 17/562,253

(22) Filed: Dec. 27, 2021

(65) Prior Publication Data

US 2022/0217456 A1 Jul. 7, 2022

(30) Foreign Application Priority Data

Jan. 4, 2021 (CN) .......................... 202110002678.3

(51) Int. Cl.
*H04Q 11/00* (2006.01)

(52) U.S. Cl.
CPC . *H04Q 11/0067* (2013.01); *H04Q 2011/0064* (2013.01)

(58) Field of Classification Search
CPC ....... H04Q 11/0067; H04Q 2011/0064; H04Q 11/0062; H04Q 2011/0079; H04B 10/27
(Continued)

(56) References Cited

U.S. PATENT DOCUMENTS 8,526,815 B2 * 9/2013 Adler ................. H04Q 11/0067
398/58
10,461,864 B2 10/2019 Bernard
(Continued)

FOREIGN PATENT DOCUMENTS

CN 101039214 A * 9/2007
CN 101686095 A * 3/2010 ............. H04B 10/27
(Continued)

OTHER PUBLICATIONS

Chinese Office Action and Search Report for Chinese Patent Application No. 2021100026783 dated Aug. 22, 2024 and English Translation thereof.

*Primary Examiner* — Abbas H Alagheband
(74) *Attorney, Agent, or Firm* — Harness, Dickey & Pierce, P.L.C.

(57) ABSTRACT

In response to a first channel associated with a first OLT and a second channel associated with a second OLT being enabled for target traffic, a traffic scheduler for scheduling the target traffic is determined by the first OLT. The first channel and the second channel correspond to a first wavelength and a second wavelength, respectively. The first OLT transmits channel configurations and offset information to an ONU, based on scheduling of a first group of data units and a second group of data units of the target traffic by the traffic scheduler on the first channel and the second channel, respectively. The channel configurations indicate channel identifications associated with the first channel and the second channel, and the offset information indicates timing information of the first group of data units and the second group of data units corresponding to physical frames transmitted on the first and second channels.

20 Claims, 10 Drawing Sheets

(58) Field of Classification Search
USPC .......................................................... 398/72
See application file for complete search history.

(56) References Cited

U.S. PATENT DOCUMENTS

| | | | |
|---|---|---|---|
| 10,608,940 B2* | 3/2020 | Goodson | H04L 47/783 |
| 2012/0294611 A1* | 11/2012 | Adler | H04Q 11/0067 |
| | | | 398/45 |
| 2013/0243435 A1* | 9/2013 | Hirth | H04J 14/0247 |
| | | | 398/67 |
| 2014/0178067 A1* | 6/2014 | Cheng | H04B 10/27 |
| | | | 398/45 |
| 2015/0207585 A1 | 7/2015 | Luo et al. | |
| 2015/0350083 A1 | 12/2015 | Goodson et al. | |
| 2017/0223438 A1 | 8/2017 | Detwiler et al. | |
| 2019/0089478 A1* | 3/2019 | Effenberger | H04J 14/0267 |
| 2019/0109665 A1* | 4/2019 | Luo | H04L 12/4633 |
| 2019/0313169 A1 | 10/2019 | Geng et al. | |
| 2022/0329321 A1* | 10/2022 | Yoshino | H04L 12/4645 |

FOREIGN PATENT DOCUMENTS

| | | | | |
|---|---|---|---|---|
| CN | 101711484 A | 5/2010 | | |
| CN | 110213678 A | 9/2019 | | |
| WO | WO-2013075507 A1 * | 5/2013 | ........... | H04B 10/032 |
| WO | 2017184860 A1 | 10/2017 | | |

* cited by examiner

METHOD, DEVICE AND COMPUTER READABLE STORAGE MEDIUM IMPLEMENTED IN AN OPTICAL NETWORK

CROSS-REFERENCE TO RELATED APPLICATIONS

This application is based on and claims priority under 35 U.S.C. § 119 Chinese Patent Application No. 2021 1 0002678.3, filed Jan. 4, 2021, the entire contents of each of which are hereby incorporated by reference.

FIELD

Embodiments of the present disclosure generally relate to communication technology, and more specifically, to method, device, and computer readable storage medium implemented in an optical network.

BACKGROUND

With the advent of 5G era, a 10 Gigabit Passive Optical Network (XG-PON) has shown a trend toward ultra-high transmission rates, such as, 25 Gbit/s, 50 Gbit/s, 100 Gbit/s and so on. Such an optical network puts forward higher requirements on the sensitivity of the optical devices on both sides of an optical line terminal (OLT) and an optical network unit (ONU), the complexity of signal processing, and the transmission channel between the two, etc.

Ethernet-based EPON technology has proposed wavelength division multiplexing (WDM)-based multi-channel joint data transmission. An EPON data transmission system introduces a coordination sublayer between a media access control (MAC) layer and a physical (PHY) layer to achieve channel bundling. Through the channel bundling, the capacity of multiple channels can be used for one service data stream. Conventional channel bundling is based on Ethernet Link Aggregation Group (LAG) technology, which treats PON wavelength channels as independent and transparent Layer 2 links, but this way of channel bundling may not be suitable for XG-PON architecture and cannot satisfy the system needs.

SUMMARY

Generally, embodiments of the present disclosure propose method, device, and computer-readable storage medium implemented in an optical network.

In a first aspect, an embodiment of the present disclosure provides a first OLT. The first OLT comprises: at least one processor; and at least one memory. The memory comprises computer program codes. The at least one memory and the computer program codes are configured to, with the at least one processor, cause the first OLT to: determine, in response to a first channel associated with the first OLT and a second channel associated with a second OLT being enabled for a target traffic, a traffic scheduler for scheduling the target traffic, wherein the first channel corresponds to a first wavelength, the second channel corresponds to a second wavelength which is different from the first wavelength; and transmit channel configurations and offset information to an optical network unit (ONU), based on scheduling of a first group of data units and a second group of data units of the target traffic by the traffic scheduler on the first channel and the second channel, respectively, wherein the channel configurations indicate channel identifications associated with the first channel and the second channel, and the offset information indicates timing information of the first group of data units and the second group of data units corresponding to physical frames transmitted on the first channel and the second channel.

In a second aspect, an embodiment of the present disclosure provides a traffic scheduler. The traffic scheduler comprises: at least one processor; and at least one memory. The memory comprises computer program codes. The at least one memory and the computer program codes are configured to, with the at least one processor, cause the traffic scheduler to: obtain, in response to a first channel associated with a first optical line terminal (OLT) and a second channel associated with a second OLT being enabled for a target traffic, scheduling status of the first channel and the second channel from the first OLT and the second OLT, wherein the first channel corresponds to a first wavelength, and the second channel corresponds to a second wavelength which is different from the first wavelength; determine, based on the scheduling status, scheduling of a first group of data units and a second group of data units of the target traffic on the first channel and the second channel, respectively; and indicate offset information to the first OLT and the second OLT, the offset information indicating timing information of the first group of data units and the second group of data units corresponding to physical frames transmitted on the first channel and the second channel.

In a third aspect, an embodiment of the present disclosure provides an optical network unit (ONU). The ONU comprises: at least one processor; and at least one memory. The memory comprises computer program codes. The at least one memory and the computer program codes are configured to, with the at least one processor, cause the ONU to: enable a first channel with a first optical line terminal (OLT) and a second channel with the second OLT for a target traffic, wherein the first channel corresponds to a first wavelength, and the second channel corresponds to a second wavelength which is different from the first wavelength; and receive channel configurations and offset information from the first OLT, wherein the channel configurations indicate channel identifications associated with the first channel and the second channel, and the offset information indicates timing information of a first group of data units and a second group of data units corresponding to physical frames transmitted on the first channel and the second channel.

In a fourth aspect, an embodiment of the present disclosure provides a method for optical communications. The method comprises: determining, by a first optical line terminal (OLT) in response to a first channel associated with the first OLT and a second channel associated with a second OLT being enabled for a target traffic, a traffic scheduler for scheduling the target traffic, wherein the first channel corresponds to a first wavelength, the second channel corresponds to a second wavelength which is different from the first wavelength; and transmitting channel configurations and offset information to an optical network unit (ONU), based on scheduling of a first group of data units and a second group of data units of the target traffic by the traffic scheduler on the first channel and the second channel, respectively, wherein the channel configurations indicate channel identification associated with the first channel and the second channel, and the offset information indicates timing information of the first group of data units and the second group of data units corresponding to physical frames transmitted on the first channel and the second channel.

In a fifth aspect, an embodiment of the present disclosure provides a method for optical communications. The method comprises: obtaining, by a traffic scheduler in response to a first channel associated with a first optical line terminal (OLT) and a second channel associated with a second OLT being enabled for a target traffic, scheduling status of the first channel and the second channel from the first OLT and the second OLT, wherein the first channel corresponds to a first wavelength, and the second channel corresponds to a second wavelength which is different from the first wavelength; determining, based on the scheduling status, scheduling of a first group of data units and a second group of data units of the target traffic on the first channel and the second channel, respectively; and transmitting offset information to the first OLT and the second OLT, the offset information indicating timing information of the first group of data units and the second group of data units corresponding to physical frames transmitted on the first channel and the second channel.

In a sixth aspect, an embodiment of the present disclosure provides a method for optical communications. The method comprises: enabling, by an optical network unit (ONU), a first channel with a first optical line terminal (OLT) and a second channel with the second OLT for a target traffic, wherein the first channel corresponds to a first wavelength, and the second channel corresponds to a second wavelength which is different from the first wavelength; and receiving channel configurations and offset information from the first OLT, wherein the channel configurations indicate channel identifications associated with the first channel and the second channel, and the offset information indicates timing information of a first group of data units and a second group of data units corresponding to physical frames transmitted on the first channel and the second channel.

In a seventh aspect, an embodiment of the present disclosure provides an apparatus for communication in an optical network. The apparatus comprises means for performing the method according to the fourth aspect.

In an eighth aspect, an embodiment of the present disclosure provides an apparatus for communication in an optical network. The apparatus comprises means for performing the method according to the fifth aspect.

In a ninth aspect, an embodiment of the present disclosure provides an apparatus for communication in an optical network. The apparatus comprises means for performing the method according to the sixth aspect.

In a tenth aspect, an embodiment of the present disclosure provides a computer-readable storage medium having a computer program stored thereon. The computer program comprising instructions, which when executed by a processor on a device, cause the device to execute the method according to the fourth aspect.

In an eleventh aspect, an embodiment of the present disclosure provides a computer-readable storage medium having a computer program stored thereon. The computer program comprising instructions, which when executed by a processor on a device, cause the device to execute the method according to the fifth aspect.

In a twelfth aspect, an embodiment of the present disclosure provides a computer-readable storage medium having a computer program stored thereon. The computer program comprising instructions, which when executed by a processor on a device, cause the device to execute the method according to the sixth aspect.

It should be understood that the content described in the Summary is not intended to limit the key or important features of example embodiments of the present disclosure, nor to limit the scope of the present disclosure. Other features of the present disclosure will be easily understood by the following description.

BRIEF DESCRIPTION OF THE DRAWINGS

Some example embodiments will now be described with reference to the accompanying drawings, in which.

In various drawings, the same or similar reference signs indicate the same or similar elements.

DETAILED DESCRIPTION

Figure 1:
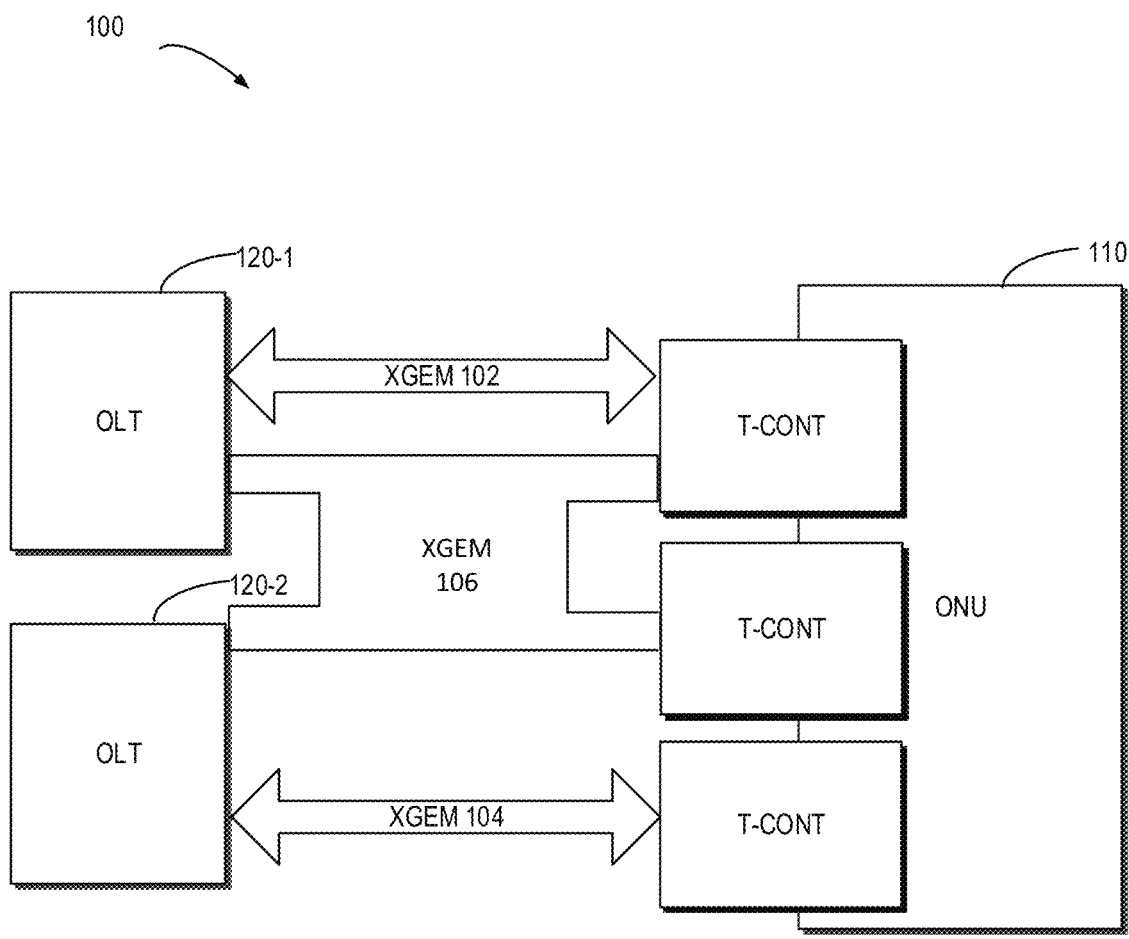
FIG. 1 illustrates a schematic diagram of a WDM-based optical communication network.

Preferred embodiments of the present disclosure will be described below in more detail with reference to the accompanying drawings. Although the preferred embodiments of the present disclosure are shown in the drawings, it should be understood that the present disclosure can be implemented in various forms and should not be limited by the embodiments set forth herein. Instead, these embodiments are provided to make the present disclosure more thorough and complete, and to fully convey the scope of the present disclosure to those skilled in the art.

The term "including" and its variants as used herein mean open-ended inclusion, that is, "including but not limited to". Unless specifically stated, the term "or" means "and/or". The term "based on" means "based at least in part on." The terms "example embodiment" and "certain embodiments" mean "at least one example embodiment." The following may also include other explicit and implicit definitions.

The term "circuitry" as used herein refers to one or more of the following:

(a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s), software, and memory(ies) that work together to cause an apparatus, such as OLT, ONU or other computing devices, etc. to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term "circuitry" also covers an implementation of merely a hardware circuit or processor (or processors) or portion of a hardware circuit or processor or its (or their) accompanying software and/or firmware. The term "circuitry" also covers, for example and if applicable to the particular claim element, a baseband integrated circuit or processor integrated circuit or a similar integrated circuit in OLT, ONU or other computing devices.

As used herein, the terms "optical network", "optical communication network", "passive optical network", and "PON" refer to that the optical distribution network (ODN) it includes consists of passive devices such as optical splitters and optical fibers, without any active devices, which includes, but not limited to, Gigabit Passive Optical Network (GPON), 10 Gigabit Passive Optical Network (XG-PON), 10 Gigabit Symmetrical Passive Optical Network (XGS-PON), Next Generation Passive Optical Network (NG-PON) and other currently known or future developed optical communication networks.

As used herein, the terms "optical line terminal" and "OLT" refer to a terminal equipment as a multi-service offering platform in the optical network, which has functions of real-time monitoring, management and maintenance of the DPU.

The terms "optical network unit" and "ONU" as used herein refer to optical nodes that receive traffic data from the OLT in the optical network, and respond to the OLT for receiving the traffic data, and provide the traffic data to end users. In addition, the ONU collects and buffers uplink data that the user needs to send to the network, and sends the buffered data to the OLT according to the assigned sending windows.

The term "dynamic bandwidth allocation unit" or "DBA" as used herein refer to a function or unit that can dynamically allocate uplink time slots and bandwidth within a time interval of microseconds or milliseconds, and usually resides at the OLT. Specifically, the DBA can monitor the PON in real time, so that the OLT can dynamically adjust the uplink time slot and bandwidth allocation according to the current network congestion, bandwidth utilization, and bandwidth configuration.

Recently, the concept of XG-PON encapsulation method (XGEM) bundling in the service adaptation sublayer of the PON system of 50 Gbps and above has been proposed. Based on XGEM bundling requirements, the traffic is divided into a plurality of segments, i.e., service data unit segments (SDU segments), and the segments are mapped to fine control of the PON frame format based on the XGEM.

FIG. 1 illustrates a schematic diagram of a WDM-based optical communication network 100. As shown in FIG. 1, there are multiple channels 102 and 104 between a single ONU 110 and more than one OLT, such as, OLTs 120-1 and 120-2. The channels 102 and 104 may correspond to a first wavelength $\lambda_1$ and a second wavelength $\lambda_2$ respectively, where the first wavelength $\lambda_1$ is different from the second wavelength $\lambda_2$. The bundled XGEM 106 can be viewed as a logical link with multiple physical channels. The SDU segment transmitted on the bundled XGEM 106 may be referred to as bundled SDUs. In PON protocol stack of the International Telecommunication Union Telecommunication Standardization Sector (ITU-T), the bundled XGEM resides in transmission containers (T-CONTs) on multiple channels processed by different OLTs 120-1 and 120-2.

In order to implement the bundled XGEM on the multi-wavelength channels 102 and 104, there are two possible ways. One is a protocol-based bundling scheme, and the other is a timing-based bundling scheme. In general, the protocol-based bundling scheme is simpler, but requires an extension of the XGEM frame structure and more buffers.

The timing-based bundling scheme can reduce buffer requirements, which in turn can reduce latency. However, this scheme requires PHY frames on the bundled wavelengths to maintain byte synchronization, and at the same time requires a cross-channel termination (CT) coordination mechanism scheduled by DBA. Specifically, for the conventional XGEM frame structure, the SDU of the data traffic needs to be divided into multiple SDU segments (i.e., the bundled XGEM frames). In the conventional system, there is a lack of an identifier to indicate the sequence between the segments, so that a receiver of these segments can only use timing information to reassemble the SDUs. Since the scheduling of the T-CONT occurs independently in the DBAs of different OLT channel terminations (CTs), mapping the bundled XGEM frames to different T-CONTs requires cross-CT coordination of DBA scheduling. In absence of such a mechanism, the timing of the XGEM across different channels cannot be guaranteed. On the other hand, a super frame counter (SFC) is an important counter for channel activation and XGEM encryption, and the value of the SFC should be set independently of each channel. In this regard, when the wavelength channel is established in a pay-on-demand way, it is not necessary to enforce to set the same SFC value for each channel. However, in a conventional system, the SFC value for the bundled XGEM frame must remain the same; otherwise the ONU will not be clear about the sequence of the corresponding PHY frames.

In order to solve the above-mentioned problems and potential other problems, a timing-based XGEM bundling scheme is provided in an example embodiment of the present disclosure. This scheme can coordinate among multiple OLT CTs in the system by the DBA to ensure that the timing of the bundled XGEM frames on the bundled channels is consistent. Therefore, the timing relationship of the SDU segments is globally determined on all channels. In addition, the ONU is clearly informed of a SFC offset value of the bundled XGEM frames by introducing a coordination message (for example, an ONU management and control channel (OMCC) command and a physical layer operation, administration and maintenance (PLOAM) message), eliminating the constraint of employing the same SFC value for the bundled frames in the conventional system. Such a channel bundling scheme can realize a precise scheduling of the bundled XGEM, thereby improving the system performance of the WDM-based optical communication network.

Figure 2A:
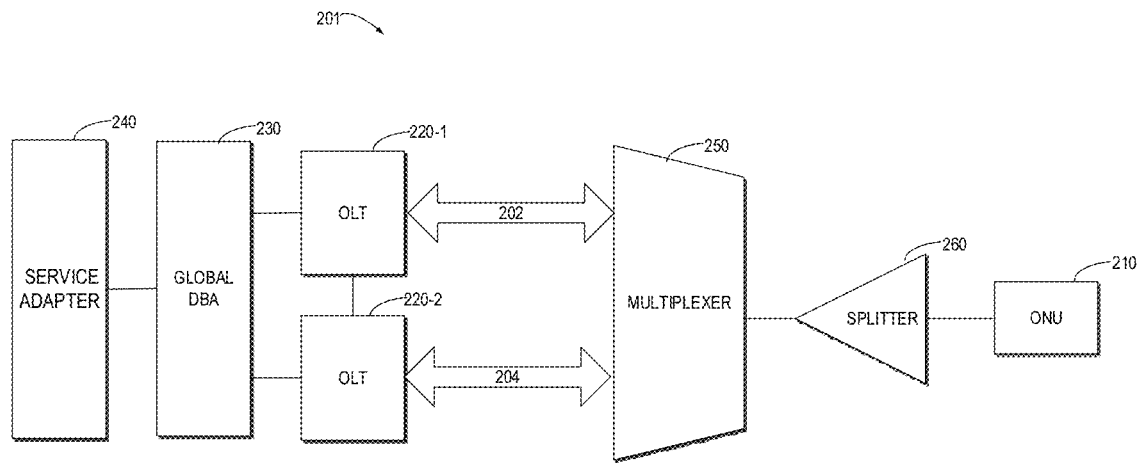
FIG. 2A illustrates an example optical network in which an example embodiment of the present disclosure may be implemented.

FIG. 2A illustrates an example optical network 201 in which an example embodiment of the present disclosure may be implemented. It should be understood that the network architecture shown in FIG. 2A is only for purpose of example, and does not imply any limitation on the scope of the present disclosure. The embodiments of the present disclosure can be embodied in different optical network architectures.

As shown in FIG. 2A, the optical network 201 may include optical communication networks according to standards such as GPON, XG-PON, XGS-PON, NG-PON, etc., or any currently known or future developed optical communication networks. The optical network 201 includes ONU 210, OLTs 220-1 and 220-2 (hereinafter, also collectively referred to as 220), a global DBA device 230, a service adapter 240, a multiplexer 250, and a splitter 260. There is a first channel 202 and a second channel 204 between the ONU 210 and the OLTs 220-1 and 220-2 respectively, wherein the first channel 202 corresponds to a first wavelength $\lambda_1$, the second channel 204 corresponds to a second wavelength $\lambda_2$, and the first wavelength $\lambda_1$ is different from the second wavelength $\lambda_2$. Although only a limited number of ONUs, OLTs and channels are shown in FIG. 2A, the number is exemplary and not limiting. In practice, there can be more ONUs, OLTs and channels between the two as needed.

The ONU 210 may enable the first channel 202 with the OLT 220-1 and the second channel 204 with the OLT 220-2 for data traffic transmission. For example, the ONU 210 initially only employs the first channel 202 to transmit data traffic. As the demand for bandwidth capacity increases, the ONU 210 can activate the second channel 204 in a pay-on-demand way. In this way, the two channels 202 and 204 are used to carry the bundled XGEM ports, which can increase available bandwidth between the ONU 210 and the OLT 220.

The OLT 220-1 and the OLT 220-2 can communicate with each other using Interaction Channel Termination Protocol (ICTP). Compared with the conventional system, the OLT 220-1 and the OLT 220-2 no longer employ a separate DBA configured on them to allocate bandwidth for uplink traffic. As shown in FIG. 2A, the OLT 220-1 and the OLT 220-2 are connected to the global DBA device 230 separated therefrom.

In an example embodiment, the global DBA device 230 acts as a traffic scheduler, which is configured for implementing XGEM bundling and global scheduling between the first channel 202 and the second channel 204. In some example embodiments, the global DBA device 230 collects the scheduling status of the first channel 202 and the second channel 204, and schedules uplink bursts from the ONU 210 on the bundled channels based on the scheduling status.

As mentioned above, the SDU of data traffic is divided into multiple SDU segments, which are encapsulated into the XGEM frames and transmitted on the corresponding bundled channels 202 and 204. In some example embodiments, the global DBA device 230 may determine the timing relationship between the bundled XGEM frames transmitted on the bundled channels 202 and 204. As an example, a given SDU of data traffic is divided into three SDU segments, and the three SDU segments are encapsulated into three XGEM frames respectively. The three XGEM frames are then encapsulated into corresponding PHY layer frames, then the position of each XGEM frame in their respective PHY frame represents the sequence of these SDU segments. If the scheduling of these channels is independent, it can be ensured that the positions of the XGEM frames (timing sequence) have any deterministic relationship.

Similarly, in the downlink direction, the service adapter 240 is configured to encapsulate the data traffic into the XGEM frames. These XGEM frames are then encapsulated into the PHY layer frames. For the bundled XGEM frames, the service adapter 240 is also used to determine the timing relationship of the SDU segments on different channels 202 and 204.

Figure 2B:
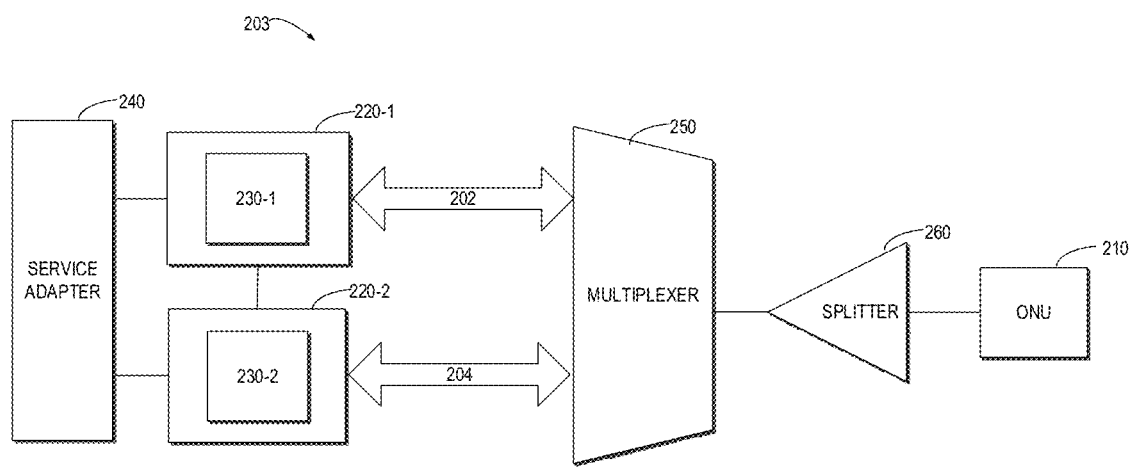
FIG. 2B illustrates another example optical network in which an example embodiment of the present disclosure may be implemented.

FIG. 2B illustrates another example optical network 203 in which an example embodiment of the present disclosure may be implemented. It should be understood that the network architecture shown in FIG. 2B is only for purpose of example, and does not imply any limitation on the scope of the present disclosure. The embodiments of the present disclosure can be embodied in different optical network architectures.

Similar to the optical network 201 shown in FIG. 2A, the optical network 203 may include optical communication networks according to standards such as GPON, XG-PON, XGS-PON, NG-PON, etc., or any currently known or future developed optical communication networks. The optical network 203 can include ONU 210, OLTs 220-1 and 220-2 (hereinafter, also collectively referred to as 220), a service adapter 240, a multiplexer 250, and a splitter 260. There is a first channel 202 and a second channel 204 between the ONU 210 and the OLTs 220-1 and 220-2 respectively, wherein the first channel 202 corresponds to a first wavelength $\lambda_1$, the second channel 204 corresponds to a second wavelength $\lambda_2$, and the first wavelength $\lambda_1$ is different from the second wavelength $\lambda_2$. Although only a limited number of ONUs, OLTs and channels are shown in FIG. 2B, the number is exemplary and not limiting. In practice, there can be more ONUs, OLTs and channels between the two as needed.

The ONU 210 may enable the first channel 202 with the OLT 220-1 and the second channel 204 with the OLT 220-2 for data traffic transmission. For example, when channel bundling is not performed, the ONU 210 may independently utilize one or all of the channels 202 and 204 to transmit corresponding data traffic. As the demand of a certain data traffic for bandwidth capacity increases, the ONU 210 can activate the second channel 204 in a pay-on-demand way. In this way, the two channels 202 and 204 are used to carry the bundled XGEM ports, which can increase available bandwidth between the ONU 210 and the OLT 220.

Compared with the optical network 201 shown in FIG. 2A, the OLT 220-1 and the OLT 220-2 have a first DBA device 230-1 and a second DBA device 230-2 configured on them respectively. Such configuration changes little of the current network architecture and can be better compatible with the conventional optical network technologies. In an embodiment where channel bundling is not initiated, the first DBA device 230-1 and the second DBA device 230-2 can operate independently on the OLT 220-1 and the OLT 220-2 in a conventional manner. In an embodiment where channel bundling is initiated, the OLT 220-1 and the OLT 220-2 may negotiate to select one of the first DBA device 230-1 and the second DBA device 230-2 as a master DBA device, which acts as a traffic scheduler.

In some example embodiments, the function of the selected master DBA device is similar to the function of the global DBA device 230 shown in FIG. 2A, including realizing XGEM bundling and global scheduling between the first channel 202 and the second channel 204. In some example embodiments, the master DBA device collects the scheduling status of the first channel 202 and the second channel 204, and schedules the uplink bursts from the ONU 210 on the bundled channels based on the scheduling status. This will be discussed in further detail below.

In some example embodiments, the function of the DBA on another OLT that is not selected as the master DBA device may be disabled, so as not to cause uncertainty in the timing of the SDU segments. In some other embodiments, after the master DBA device is selected, the two DBA devices 230-1 and 230-2 may still maintain their independent DBA functions, but the scheduling result of each DBA of the first DBA device 230-1 and the second DBA device 230-2 is obtained in real time by the SDU reassembly function. In this way, the correct T-CONT timing relationship that the ONU "sees" on all its available channels can be determined by jointly using the DBA scheduling result and the bundled SDU reassembly function, so that the SDU bytes can be extracted in the correct order.

It should be understood that the various network elements or entities in the optical networks 201 and 203 may be physical or virtual, and may be implemented in any suitable manner, only for illustrative and non-restrictive purposes. The number of network elements or entities shown is only an example, not a limitation. Moreover, any communication technology that is currently known and future developed can be used to communicate between elements or entities.

Figure 3:
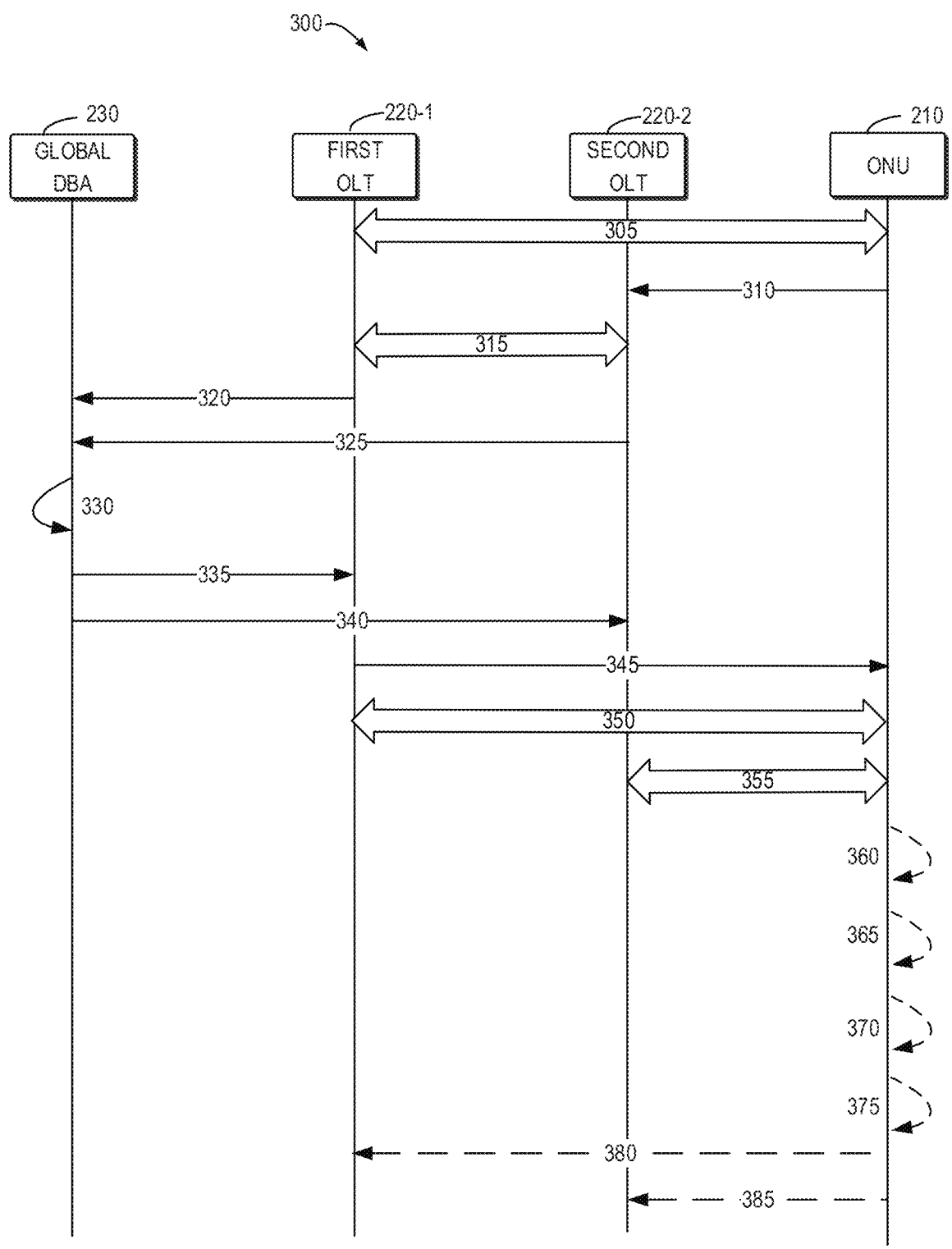
FIG. 3 illustrates a signaling flow of an example interaction process according to an example embodiment of the present disclosure.

FIG. 3 illustrates a signaling flow of an example interaction process 300 according to an example embodiment of the present disclosure. The interaction process 300 can be implemented in the example optical network 201. For the purpose of discussion, the process 300 will be described with reference to the ONU 210, the OLTs 220-1 and 220-2, and the global DBA device 230 in FIG. 2A. For ease of description and distinction, in the process 300, the OLT 220-1 is also referred to as the first OLT, the OLT 220-2 is also referred to as the second OLT, and the global DBA device 230 is also referred to as the traffic scheduler.

As described above, the ONU 210 may initially perform (305) transmission of target traffic with the first OLT 220-1 on the first channel 202 between the ONU 210 and the first OLT 220-1. In the context of an example embodiment of the present disclosure, the transmission of the target traffic between the ONU 210 and the OLT 220 includes at least one of uplink transmission from the ONU 210 to the OLT 220 and downlink transmission from the OLT 220 to the ONU 210.

In some example embodiments, the multi-wavelength channel bundling may be initiated between the ONU 210 and the OLT 220, for example, in order to provide additional bandwidth capacity for the target traffic. In this case, in addition to the existing first channel 202, the ONU 210 also enables (310) the second channel 204 with the second OLT 220-2 for the target traffic. In this example, the first channel 202 corresponds to the first wavelength $\lambda_1$, the second channel 204 corresponds to the second different wavelength $\lambda_2$ which is different from the first wavelength $\lambda_1$.

In response to the first channel 202 associated with the first OLT 220-1 and the second channel 204 associated with the second OLT 220-2 are enabled for the target traffic, the first OLT 220-1 and the second OLT 220-2 determine (315) the traffic scheduler, i.e., the global DBA device 230 used to schedule the data units of the target traffic.

The first OLT 220-1 and the second OLT 220-2 are registered with the global DBA device 230, respectively. In some example embodiments, the first OLT 220-1 and the second OLT 220-2 may directly call an interface of the global DBA device 230 without additional ICTP communication. After the registration is completed, the global DBA device 230 may obtain (320, 325) the scheduling status of the channels 202 and 204 from the first OLT 220-1 and the second OLT 220-2.

The global DBA device 230 determines (330) the scheduling of the data units of the target traffic on the bundled channels based on the scheduling status of all channels. From the perspective of the XGEM adaptation layer, the global DBA device 230 can schedule all bundled channels in a globally determined manner. In some example embodiments, the data units of the target traffic may be divided into a first group of data units scheduled on the first channel 202 and a second group of data units scheduled on the second channel 204. In some example embodiments, the first group of data units and the second group of data units will be encapsulated as XGEM frames by the first OLT 220-1 and the second OLT 220-2, respectively, and then encapsulated as physical frames transmitted on the first OLT 220-1 and the second OLT 220-2.

Based on the determination of the scheduling, the global DBA device 230 transmits (335, 340) offset information to the first OLT 220-1 and the second OLT 220-2. In some example embodiments, the offset information indicates the timing information of the first group of data units and the second group of data units corresponding to the physical frames to be transmitted on the first OLT 220-1 and the second OLT 220-2.

The first OLT 220-1 and the second OLT 220-2 transmit (345) channel configurations and offset information to the ONU 210 respectively. The channel configurations may indicate a channel identifier associated with the bundled channels, i.e., the first channel 202 and the second channel 204. In some example embodiments, the channel configurations may include a XGEM port number associated with the first channel 202 and the second channel 204, such as a XGEM port ID.

As an example, multiple channels may be assigned with the same XGEM port ID. In this case, the ONU 210 may identify the XGEM frames attached with the port ID as the bundled XGEM frames. In further example, multiple channels may be assigned with different XGEM port IDs, i.e., the XGEM port IDs may have different values. In this case, one or both of the first OLT 220-1 and the second OLT 220-2 can indicate the corresponding port ID of each channel in the bundled channels through the channel configurations, so that the ONU 210 processes the corresponding XGEM frame as a bundled frame. In some example embodiments, the XGEM port ID transmission and configuration process can be implemented on any of the first wavelength $\lambda_1$ and the second wavelength $\lambda_2$ through the OMCC channel. Alternatively, in some other embodiments, a PLOAM message may be used to carry such channel configuration command. Of course, the OMCC and PLOAM messages are only given as exemplary implementations, and any other suitable message and signaling can also be used for transmitting the channel configurations, and thus the scope of the present disclosure is not limited in this respect.

The offset information may indicate the timing information of the first group of data units and the second group of data units corresponding to the physical frames transmitted on the first channel 202 and the second channel 204. In some example embodiments, the downlink SFC values for the multi-wavelength bundled channels 202 and 204 are synchronized. In this case, the ONU 210 can directly extract the bundled frames from different PHY frames with the same SFC value, and then reorganize the SDU of the target traffic. In other embodiments, the SFC values of the bundled channels 202 and 204 may be different, but the PHY frame should still be synchronized with the frame rate, so that the SFC value of the bundled channels always maintains a fixed offset.

In order to notify the ONU 210 of the offset information, in some example embodiments, one or both of the first OLT 220-1 and the second OLT 220-2 may be transmitted to the ONU 210 through one of the OMCC and PLOAM messages. In some embodiments, the super frame counter offset may indicate the difference between the first counter associated with the downlink frame for the first channel 202 and the second counter associated with the downlink frame for the second channel 204. In other embodiments, the super frame counter offset may indicate the value of the first counter and the value of the second counter, and may in turn determine the bundling way of the bundled XGEM frames in the corresponding PHY frames based on the values of the first counter and the second counter. In still other embodiments, the super frame counter offset may indicate the values of the first counter and the second counter at a predetermined time (for example, a specific time of day), and similarly, the bundling way of the bundled XGEM frames in the corresponding PHY frames can be determined based on the corresponding values of the first counter and the second counter at the predetermined time.

In some example embodiments, the OLT 220 may transmit the channel configurations and offset information to the ONU 210 in the following manner. One or both of the OLTs 220-1 and 220-2 transmit the channel configurations including the XGEM port numbers associated with the first channel 202 and the second channel 204 to the ONU 210. The ONU 210 configures the bundled XGEM ports locally based on the received channel configurations, and transmits a successful configuration response to the corresponding OLT in the OLTs 220-1 and 220-2. After receiving the successful configuration response, the corresponding OLT in the OLTs 220-1 and 220-2 may transmit the offset information to the ONU 210. After receiving the offset information, the ONU 210 may transmit a successful receipt response to the corresponding OLT of the OLTs 220-1 and 220-2. It should be understood that the foregoing transmission methods are only given as illustrative implementations, and any other suitable transmission methods are also feasible for the embodiments of the present disclosure. The scope of the present disclosure is not affected in this respect.

The first OLT 220-1 may perform (350) transmission of the physical frame corresponding to the first group of data units with the ONU 210 on the first channel 202 based on the channel configurations and the offset information. Similarly, the second OLT 220-2 may perform (355) transmission of the physical frame corresponding to the second group of data units with the ONU 210 on the second channel 204.

In an embodiment of downlink transmission, the ONU 210 then determines (360) that the physical frame received from the first channel 202 correspond to the first group of data units and the physical frame received from the second channel 204 correspond to the second group of data units based on the channel configurations. In this case, the ONU 210 may extract the first group of data units and the second group of data units from the physical frames. The ONU 210 may determine (365) the timing relationship between the first group of data units and the second group of data units based on the offset information, for example, the offset relative to a reference time point. The ONU 210 may then determine (370) the data units of the target traffic from the first group of data units and the second group of data units based on the timing relationship. For example, the ONU 210 may reassemble the first group of data units and the second group of data units to obtain the SDU of the target traffic.

In an embodiment of uplink transmission, the ONU 210 may divide (375) the data units of the target traffic into a first group of data units and a second group of data units based on the channel configurations and offset information. The ONU 210 may encapsulate the first group of data units and the second group of data units into the XGEM frames, respectively, and encapsulate the XGEM frames into corresponding physical frames. The ONU 210 may then transmit (380) the physical frame corresponding to the first group of data units to the first OLT 220-1 on the first channel 202, and transmit (385) the physical frame corresponding to the second group of data units to the second OLT 220-2 on the second channel 204.

Figure 4:
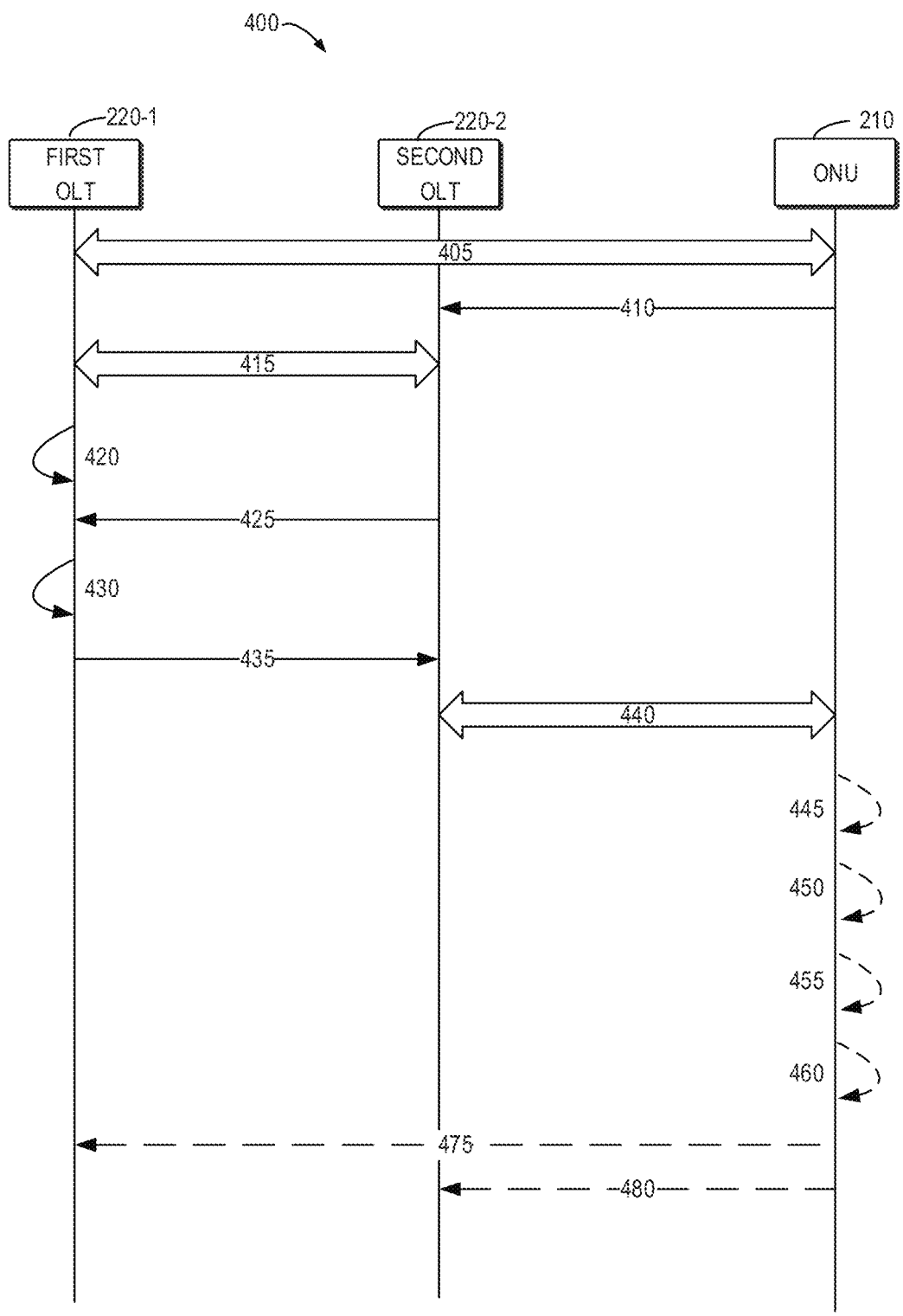
FIG. 4 illustrates a signaling flow of an example interaction process according to an example embodiment of the present disclosure.

FIG. 4 illustrates a signaling flow of an example interaction process 400 according to an example embodiment of the present disclosure. The interaction process 400 may be implemented in the example optical network 203. For the purpose of discussion, the process 400 will be described with reference to the ONU 210, the OLTs 220-1, and 220-2 in FIG. 2B. For ease of description and distinction, in the process 302, the OLT 220-1 is also referred to as the first OLT, and the OLT 220-2 is also referred to as the second OLT. The process 400 may also involve the first DBA device 230-1 and the second DBA device 230-2 on the OLTs 220-1 and 220-2, where the first DBA device 230-1 is also called a traffic scheduler.

Similar to 305, the ONU 210 may initially perform (405) transmission of the target traffic with the first OLT 220-1 on the first channel 202. In the context of an example embodiment of the present disclosure, the transmission of the target traffic includes at least one of the uplink transmission from the ONU 210 to the OLT 220 and the downlink transmission from the OLT 220 to the ONU 210.

Similar to 310, when a multi-wavelength channel bundling is initiated between the ONU 210 and the OLT 220, in addition to the existing first channel 202, the ONU 210 also enables (410) the second channel 204 with the second OLT 220-2 for the target traffic. In this example, the first channel 202 corresponds to the first wavelength $\lambda_1$, the second channel 204 corresponds to the second wavelength $\lambda_2$ which is different from the first wavelength $\lambda_1$.

In response to the first channel 202 associated with the first OLT 220-1 and the second channel 204 associated with the second OLT 220-2 are enabled for the target traffic, the first OLT 220-1 and the second OLT 220-2 determine (415) the traffic scheduler used to schedule the data units of the target traffic. In some example embodiments, the first OLT 220-1 may select the DBA configured on one of the first OLT 220-1 and the second OLT 220-2 as the traffic scheduler by negotiating with the second OLT 220-2. To facilitate discussion, in the following description, the first DBA device 230-1 of the first OLT 220-1 is determined as the traffic scheduler. Based on the result of the above negotiation, the DBA 230-2 of the second OLT 220-2 may be disabled.

The first DBA device 230-1 acting as the traffic scheduler may obtain (420, 425) the scheduling status of the first channel 202 and the second channel 204 from the first OLT 220-1 and the second OLT 220-2. The first DBA device 230-1 of the first OLT 220-1 may determine (430) the scheduling of the target traffic based on the scheduling status of all channels, for example, the scheduling of the first group of data units and the second group of data units of the target traffic on the first channel 202 and the second channel 204 respectively.

The first DBA device 230-1 acting as the traffic scheduler may indicate (435) the offset information to the first OLT 220-1 and the second OLT 220-2, so that the second OLT 220-2 performs (440) transmission of the physical frame corresponding to the second group of data units with the ONU 210 on the second channel 204 based on the offset information. The offset information indicates the timing information of the first group of data units and the second group of data units corresponding to the physical frames to be transmitted on the first channel 202 and the second channel 204. For example, the first OLT 220-1 may transmit the offset information including the super frame counter offset to the second OLT 220-2 based on ICTP. The super frame counter offset indicates the offset values of the frame sequence numbers of the PHY frames where the first group of data units and the second group of data units are respectively.

In some example embodiments, the super frame counter offset may indicate the difference between a first counter associated with a downlink frame for the first channel 202 and a second counter associated with a downlink frame for the second channel 204. In other embodiments, the super frame counter offset may indicate the value of the first counter and the value of the second counter, and then the bundling way of the bundled XGEM frames in the corresponding PHY frames can be determined based on the values of the first counter and the second counter. In still other embodiments, the super frame counter offset may indicate the values of the first counter and the second counter at a predetermined time (for example, a specific time of day), and similarly, the bundling way of the bundled XGEM frames in the corresponding PHY frames can be determined based on the corresponding values of the first counter and the second counter at the predetermined time.

The other steps 445 to 480 in the interaction process 400 are the same or similar as the steps 350 to 385 of the process 300 shown in FIG. 3. To simplify the description, the above steps are not repeated herein.

Although the various steps in the aforementioned interaction processes 300 and 400 are described in a specific order, this order is only for illustrative and not restrictive purposes. Unless clearly noted, it should not be understood that such interaction processes are required to be completed in the specific order shown or in a sequential order. In some cases, multitasking or parallel processing can be beneficial. As an example, one or more operations in the interaction processes 300 and 400 may be performed in a different order, for example, one operation may be performed before, after, or simultaneously with another operation, and so on.

According to an example embodiment of the present disclosure, a timing-based XGEM bundling scheme is provided. This scheme can coordinate among multiple OLT CTs in the system by the DBA to ensure that the timing of the bundled XGEM frames on the bundled channels is consistent. Therefore, the timing relationship of the SDU segments is determined on all channels. The scheme also introduces the coordination message (for example, the OMCC command and the PLOAM) to clearly inform the ONU of the SFC offset value of the bundled XGEM frames, eliminating the constraint of employing the same SFC value for the bundled frames in the conventional system. Such a channel bundling scheme can realize a precise scheduling of the bundled XGEM, thereby improving the system performance of the WDM-based optical communication network.

Figure 5:
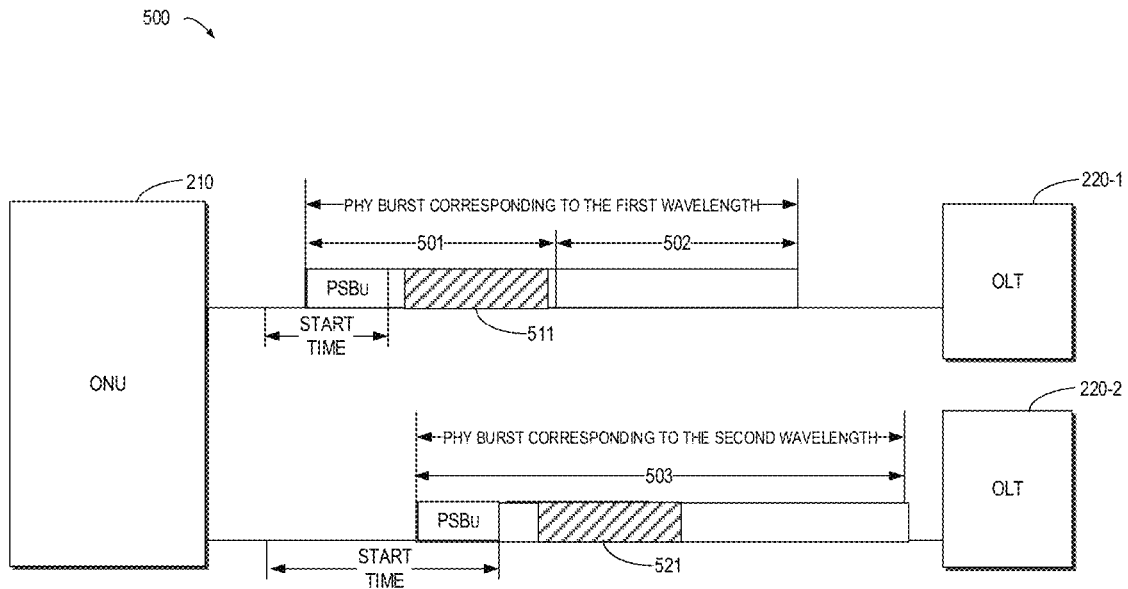
FIG. 5 illustrates a schematic diagram of an uplink burst on a multi-wavelength channel for transmitting the bundled XGEM frames according to an example embodiment of the present disclosure.

The mechanism for determining the timing relationship of the data unit segments transmitted on the bundled channels will be described below with reference to FIGS. 5-7. FIG. 5 illustrates a schematic diagram of an uplink PHY burst 500 on a multi-wavelength channel for transmitting the bundled XGEM frames according to an example embodiment of the present disclosure. The uplink burst 500 may be scheduled between the first OLT 220-1 and the second OLT 220-2 and the ONU 210 shown in FIG. 2A and FIG. 2B, and may involve the global DBA device 230 or the master DBA device serving as the traffic scheduler. For the purpose of discussion, the uplink burst 500 will be described with reference to the ONU 210, the first OLT 220-1, and the second OLT 220-2 in FIG. 2A. It should be understood that the uplink burst 500 is also suitable for scheduling by the master DBA device in FIG. 2B.

As shown in FIG. 5, the PHY burst 500 may be, for example, scheduled on the first channel 202 and the second channel 204 by the global DBA device 230, so that the timing (for example, start time) of the allocation unit is determined. There are two allocation units 501 and 502 in the PHY burst of the first wavelength $\lambda_1$, and there is one allocation unit 503 in the PHY burst of the second wavelength $\lambda_2$. In the example shown in FIG. 5, the bundled XGEM is expected to be carried by both the allocation unit 501 corresponding to the first wavelength $\lambda_1$ and the allocation unit 503 corresponding to the second wavelength $\lambda_2$. Each allocation unit can be used to carry several XGEM frames, and the global DBA device 230 does not specify the exact position of the byte word of each XGEM frame.

In the above case, as long as the processing of the time sequence of the bundled distribution units 501 to 503 in the ONU 210 is consistent with the result of the coordinated scheduling of the first OLT 220-1 and the second OLT 220-2, so that the OLT can reassemble the SDU of the target traffic from the XGEM frames 511 and 521. Therefore, the global DBA device 230 can configure the same rule to the ONU 210 and the OLT 220. From the perspective of the ONU 210, only the SDU of the target traffic is divided into multiple SDU segments according to the rule, and these SDU segments are encapsulated into the bundled XGEM frames in the associated allocation unit. The OLT 220 can simply use the same rule to determine the order of the SDU segments corresponding to the XGEM frames in the corresponding allocation units 501 to 503.

Although the transmission in the downlink direction is not described in detail for the purpose of brevity, it should be understood that similar principles can be applied to the downlink direction. As long as the relative timing sequence of the XGEM frames on multiple bundled channels for the OLT and the ONU is determined, there is no problem of determining the SDU segments and the reassembly order between the OLT and the ONU.

Figure 6:
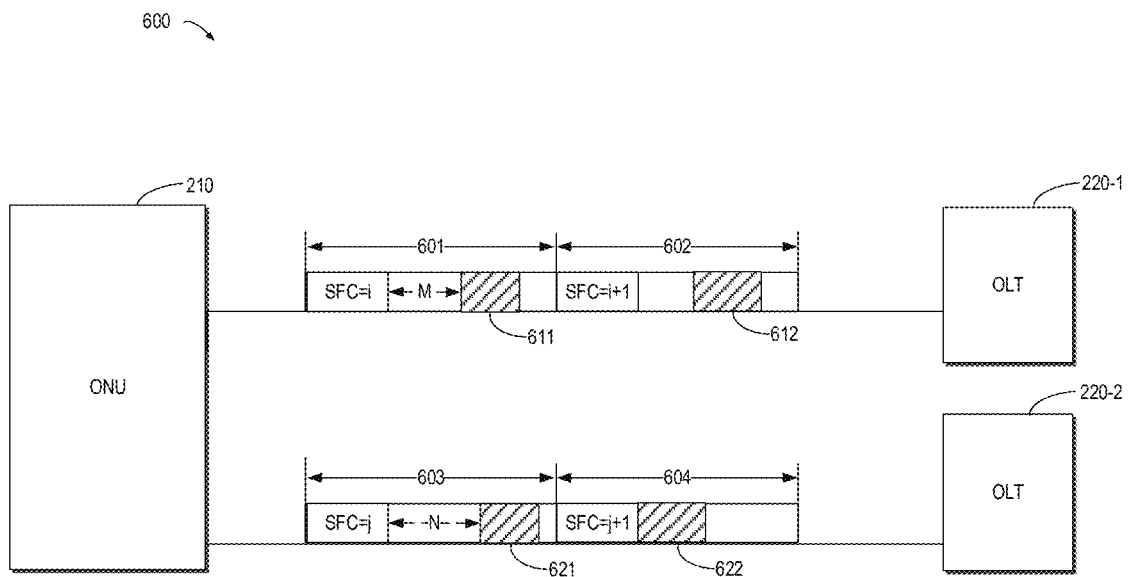
FIG. 6 illustrates a schematic diagram of aligned downlink physical frames transmitted on two bundled channels according to an example embodiment of the present disclosure.

FIG. 6 illustrates a schematic diagram of aligned downlink physical frames transmitted on two bundled channels according to an example embodiment of the present disclosure. The downlink transmission 600 shows in FIG. 6 may perform scheduling between the first OLT 220-1 and the second OLT 220-2 and the ONU 210 shown in FIGS. 2A and 2B, and may involve the service adapter 240. For the purpose of discussion, the downlink transmission 600 will be described with reference to the ONU 210, the first OLT 220-1, and the second OLT 220-2 in FIG. 2A. It should be understood that the downlink transmission 600 is also suitable for scheduling by the service adapter 240 in FIG. 2B.

The two bundled channels 202 and 204 corresponding to the first wavelength $\lambda_1$ and the second wavelength $\lambda_2$ are used to transmit the PHY frames. For each PHY frame of the PHY frames 601 to 604, the service adapter 240 inserts two SDU segments in the first channel 202 and the second channel 204 respectively, corresponding to the XGEM frames 611 and 612 as well as 621 and 622 respectively. In the example of FIG. 6, the PHY frames in the two channels are strictly aligned. Even if the SFC values on the two channels are different, the offset of the SFC value is always fixed at any given point in time. For example, SFC offset=i−j, wherein i denotes the SFC value associated with the first wavelength $\lambda_1$, and j denotes the SFC value associated with the second wavelength $\lambda_2$. In this case, the inconsistency of the SFC value on the bundled channels can be ignored. The first OLT 220-1 and the second OLT 220-2 always use a consistent timing-based rule to divide the SDU of the target traffic into aligned PHY frames, while the ONU 210 can extract the SDU segments and reassemble the SDU of the target traffic based on the same payload allocation rule.

Regardless of the uplink direction or the downlink direction, the basic principle of the timing-based SDU segments reassembly is to make the ONU 210 and the OLT 220 agree on the deterministic reference point for all bundled XGEM frames. In the example of FIG. 6, the first OLT 220-1 and the second OLT 220-2 may distribute the SDU segments according to the distance of the XGEM relative to the PHY frame header, for example, in the form of the XGEM frame. For the PHY frame 601 transmitted on the first wavelength $\lambda_1$ and the PHY frame 603 transmitted on the second wavelength $\lambda_2$, the bundled XGEM frame in the PHY frame 601 is M bytes away from the PHY frame header and the bundled XGEM frame in the PHY frame 603 is N bytes away from the PHY frame header. Therefore, the SDU segmentation can start from the XGEM frame 611 on the first wavelength $\lambda_1$. Similarly, for the PHY frames 602 and 604, the SDU segmentation starts from the XGEM frame 622 which is closer to the PHY frame header, which corresponds to the second wavelength $\lambda_2$.

Figure 7:
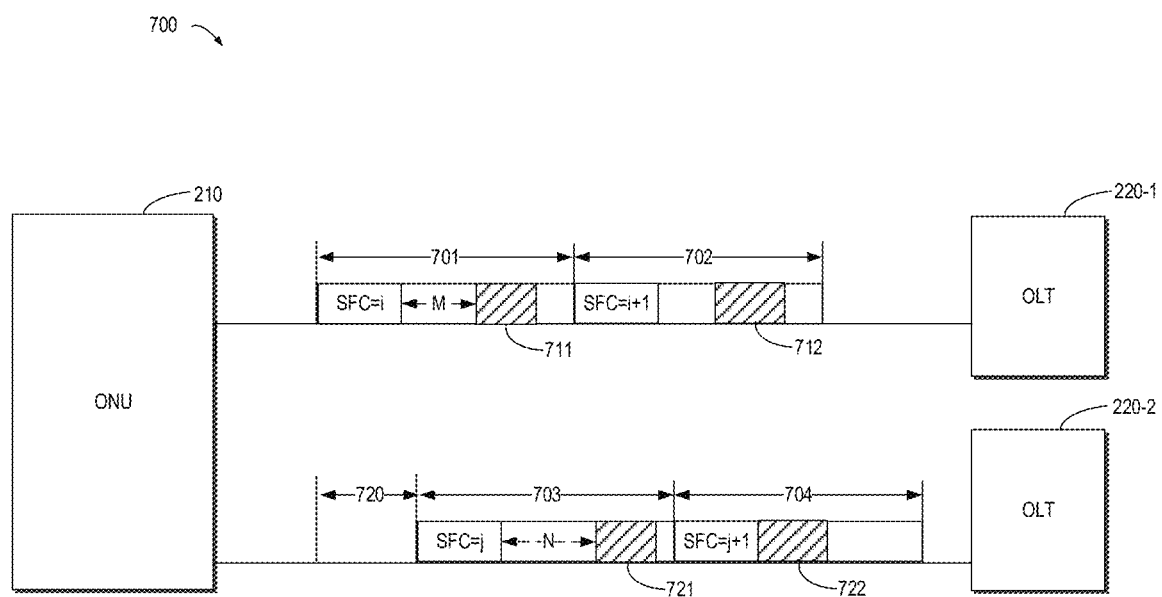
FIG. 7 illustrates a schematic diagram of unaligned downlink physical frames transmitted on two bundled channels according to an example embodiment of the present disclosure.

FIG. 7 illustrates a schematic diagram of unaligned downlink physical frames transmitted on two bundled channels according to an example embodiment of the present disclosure. The downlink transmission 700 shows in FIG. 7 may perform scheduling between the first OLT 220-1 and the second OLT 220-2 and the ONU 210 shown in FIGS. 2A and 2B. For the purpose of discussion, the downlink transmission 700 will be described with reference to the ONU 210, the first OLT 220-1, and the second OLT 220-2 in FIG. 2A.

As shown in FIG. 7, the first channel 202 and the second channel 204 corresponding to the first wavelength $\lambda_1$ and the second wavelength $\lambda_2$ which are associated with different OLTs 220-1 and 220-2 are not aligned in frame at the physical layer. According to an example embodiment of the present disclosure, it is still possible to implement the timing-based SDU reassembly based on the offset information (for example, SFC offset) of the bundled frame configured by the OLT 220 to the ONU 210.

In the example of FIG. 7, the PHY frames transmitted on the bundled channels 202 and 204 have a constant channel offset 720. If the SFC offset of the bundled frames is not agreed between the OLT 220 and the ONU 210, the ONU 210 may confuse about the reference time point. For example, the bundled XGEM frame 712 in the physical frame 702 corresponding to the first wavelength $\lambda_1$ may be reassembled with any of the XGEM frame 721 in the physical frame 703 corresponding to the second wavelength $\lambda_2$ or the XGEM frame 722 in the physical frame 704, which may cause failure of the SDU reassembly.

Only when the OLT 220 explicitly indicates the offset information, e.g., SFC offset=i−j, where i denotes the SFC value associated with the first wavelength $\lambda_1$, and j denotes the SFC value associated with the second wavelength $\lambda_2$, can the ONU 210 determine to combine the XGEM frame 711 in the physical frame 701 with the XGEM frame 721 in the physical frame 703 to reassemble the SDU of the target traffic.

Figure 8:
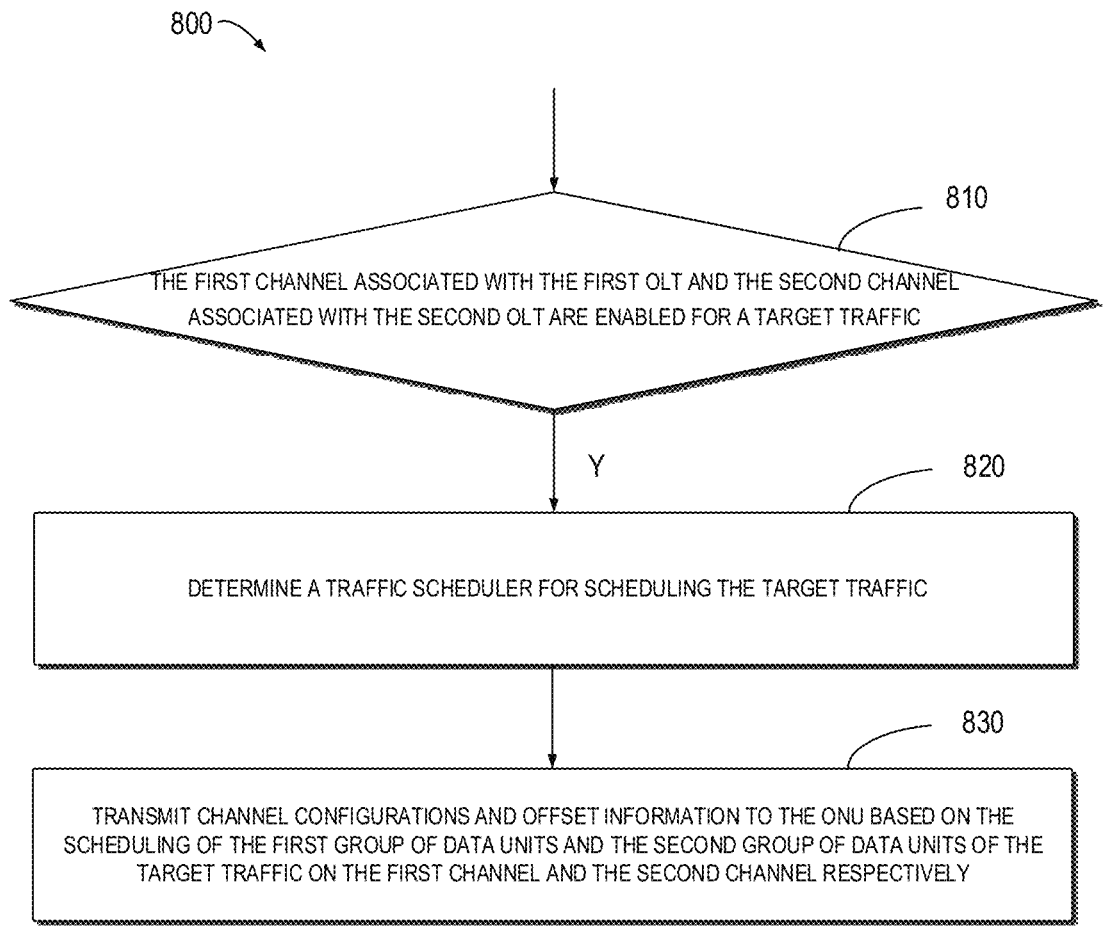
FIG. 8 illustrates a flowchart of a method according to an example embodiment of the present disclosure.

FIG. 8 illustrates a flowchart of a method 800 according to certain embodiments of the present disclosure. The method 800 may be implemented at an OLT in an optical network, for example, may be implemented at the first OLT 220-1 respectively shown in FIG. 2A and FIG. 2B, or may also be implemented using any appropriate equipment. To facilitate discussion, the method 800 will be described below in conjunction with FIG. 2A and FIG. 2B.

The multi-wavelength channel bundling is initiated between the ONU 210 and the OLT 220, for example, in order to provide additional bandwidth capacity for the target traffic. In this case, in addition to the existing first channel 202 for transmitting the target traffic, the second channel 204 with the second OLT 220-2 is also enabled for the target traffic. In an example embodiment, the first channel 202 corresponds to the first wavelength $\lambda_1$, the second channel 204 corresponds to the second wavelength $\lambda_2$ which is different from the first wavelength $\lambda_1$.

At 810, the first channel 202 associated with the first OLT 220-1 and the second channel 204 associated with the second OLT 220-2 are enabled for a target traffic. In response to enabling the multi-wavelength channel for the target traffic, at 820, the first OLT 220-1 determines a traffic scheduler for scheduling the target traffic. The first OLT 220-1 may transmit the scheduling status of the first channel 202 to the traffic scheduler, so that the traffic scheduler determines the scheduling of the target traffic on the first channel 202 and the second channel 204.

In some example embodiments, as one of the implementations of determining the traffic scheduler, the first OLT 220-1 may determine the global DBA device 230 as the traffic scheduler. In such an embodiment, the global DBA apparatus 230 is arranged outside of the first OLT 220-1 and the second OLT 220-2, and configured to determine the scheduling of the target traffic based on the scheduling status of the first channel 202 and the second channel 204 obtained from the first OLT 220-1 and the second OLT 220-2.

In other example embodiments, as another implementation of determining the traffic scheduler, the first OLT 220-1 may determine the first DBA device configured on the first OLT 220-1 as the traffic scheduler through negotiation with the second OLT 220-2 230-1. In such an embodiment, the second DBA 230-2 configured on the second OLT 220-2 may be disabled.

At 830, the first OLT 220-1 transmits channel configurations and offset information to the ONU 210 based on the scheduling of the first group of data units and the second group of data units of the target traffic on the first channel 202 and the second channel 204 by the traffic scheduler, respectively. In some example embodiments, the first OLT 220-1 may transmit the channel configurations to the ONU 210, which may indicate the channel identification associated with the first channel 202 and the second channel 204. For example, the channel configurations may include the XGEM port numbers associated with the first channel 202 and the second channel 204. The first OLT 220-1 may then receive a successful configuration response for the channel configurations from the ONU 210. In this case, the first OLT 220-1 may transmit the offset information to the ONU 210.

The offset information may indicate timing information of the first group of data units and the second group of data units corresponding to the physical frames transmitted on the first channel 202 and the second channel 204. In some example embodiments, the offset information may include a super frame counter offset, which indicates the offset value of the frame sequence numbers of the PHY frames where the first group of data units and the second group of data units are respectively. In some example embodiments, the first OLT 220-1 may transmit the super frame counter offset to the ONU 210 through one of the OMCC and PLOAM messages.

In some embodiments, the super frame counter offset may indicate the difference between the first counter associated with the downlink frame for the first channel 202 and the second counter associated with the downlink frame for the second channel 204. In other embodiments, the super frame counter offset may indicate the value of the first counter and the value of the second counter. In turn, the bundling way of the bundled XGEM frame in the corresponding PHY frame can be determined based on the value of the first counter and the second counter. In still other embodiments, the super frame counter offset may indicate the values of the first counter and the second counter at a predetermined time (for example, a specific ToD (time of day)), and similarly, the bundling way of the bundled XGEM frame in the corresponding PHY frame can be determined based on the corresponding values of the first counter and the second counter at the predetermined time.

In some example embodiments, the first OLT 220-1 may also perform transmission of the physical frame corresponding to the first group of data units with the ONU 210 on the first channel 202 based on the channel configurations and the offset information. In some example embodiments, the target traffic includes at least one of uplink traffic received by the first OLT 220-1 from the ONU 210 and downlink traffic transmitted by the first OLT 220-1 to the ONU 210.

In some example embodiments, the first OLT 220-1 may also transmit the offset information of the traffic scheduler to the second OLT 220-2, so that the second OLT 220-2 performs transmission of the physical frame corresponding to the second group of data units with the ONU 210 on the second channel 204 based on the offset information.

In an embodiment of downlink transmission, the first OLT 220-1 may transmit the physical frame corresponding to the first group of data units to the ONU 210 on the first channel 202. In an embodiment of uplink transmission, the first OLT 220-1 may receive the physical frame corresponding to the first group of data units from the ONU 210 on the first channel 202, and obtain the first group of data units corresponding to the physical frame based on the channel configurations and the offset information, for example, extract the corresponding first group of data units from the physical frame.

Figure 9:
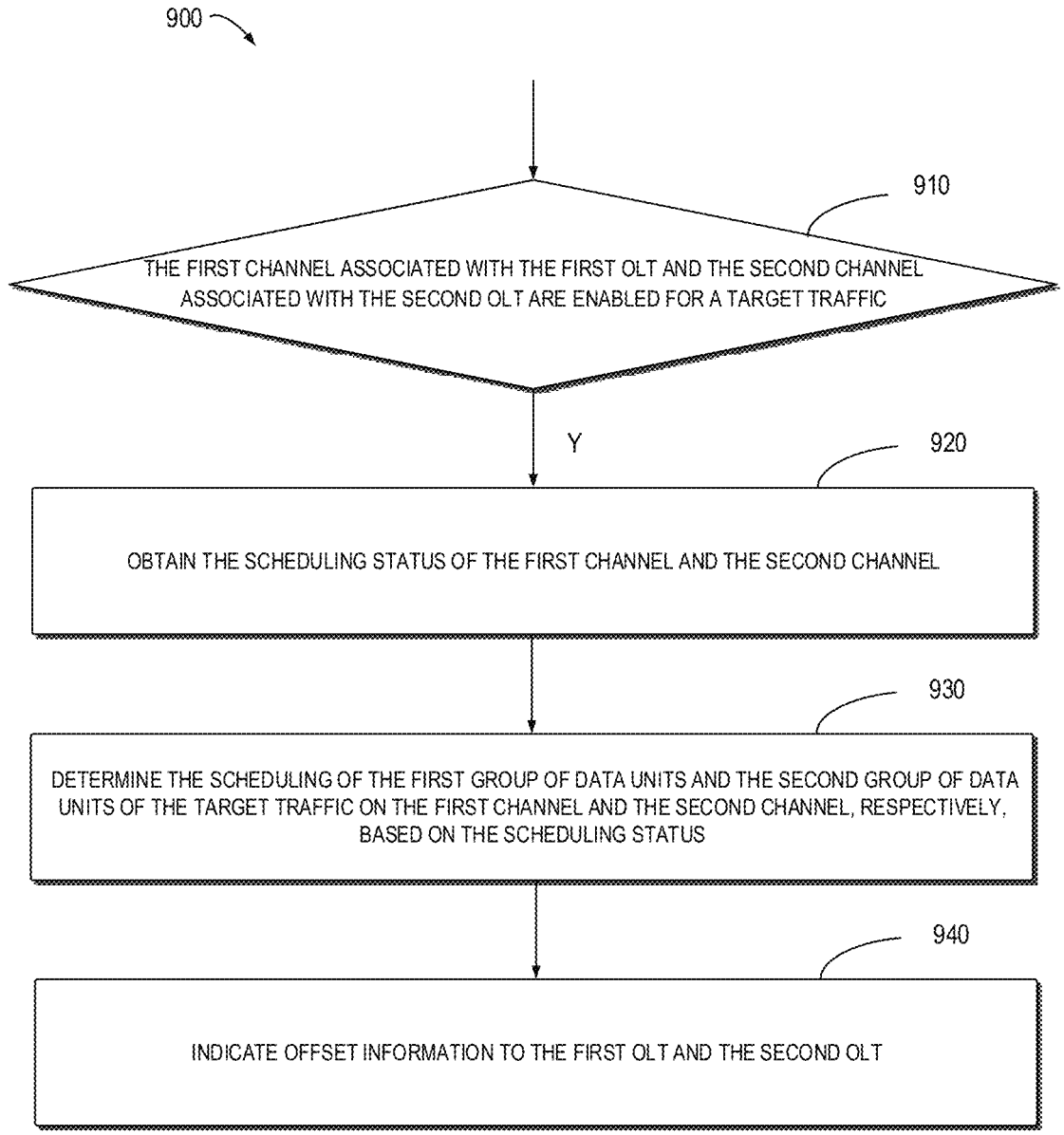
FIG. 9 illustrates a flowchart of a method according to an example embodiment of the present disclosure.

FIG. 9 illustrates a flowchart of a method 900 according to certain embodiments of the present disclosure. The method 900 may be implemented at a traffic scheduler used to implement global scheduling between the bundled channels in the optical network, for example, the global DBA device 230 shown in FIG. 2A or the master DBA device shown in FIG. 2B acting as the traffic scheduler, or it may also be implemented using any suitable device. To facilitate discussion, the method 900 will be described below in conjunction with FIG. 2A and FIG. 2B.

In an embodiment in which the multi-wavelength channel bundling is initiated between the ONU 210 and the OLT 220, in addition to the existing first channel 202 used to transmit the target traffic, the second channel 204 with the second OLT 220-2 is also enabled for the target traffic. In an example embodiment, the first channel 202 corresponds to the first wavelength $\lambda_1$, the second channel 204 corresponds to the second wavelength $\lambda_2$ which is different from the first wavelength $\lambda_1$.

At 910, the first channel 202 associated with the first OLT 220-1 and the second channel 204 associated with the second OLT 220-2 are enabled for a target traffic. In response to enabling the multi-wavelength channel for the target traffic, at 920, the traffic scheduler obtains scheduling status of the first channel 202 and the second channel 204 from the first OLT 220-1 and the second OLT 220-2.

In some example embodiments, the target traffic includes at least one of uplink traffic transmitted from the ONU 210 to the first OLT 220-1 and the second OLT 220-2 and downlink traffic transmitted from the first OLT 220-1 and the second OLT 220-2 to the ONU 210.

In some example embodiments, the traffic scheduler may include a global dynamic bandwidth unit which is arranged outside of the first OLT 220-1 and the second OLT 220-2, for example, the global DBA device 230 shown in FIG. 2A.

In other example embodiments, the traffic scheduler may include a dynamic bandwidth allocation device configured on one of the first OLT 220-1 and the second OLT 220-2, for example, the first DBA device 230-1 shown in FIG. 2B.

At 930, the traffic scheduler determines the scheduling of the first group of data units and the second group of data units of the target traffic on the first channel 202 and the second channel 204, respectively, based on the scheduling status. In some example embodiments, the data units of the target traffic may be divided into a first group of data units and the second group of data units, wherein the first group of data units will be encapsulated by the first OLT 220-1 into a physical frame to be transmitted on the first channel 202, the second group of data units will be encapsulated by the second OLT 220-2 into a physical frame to be transmitted on the second channel 204.

At 940, the traffic scheduler indicates offset information to the first OLT 220-1 and the second OLT 220-2. The offset information may indicate the timing information of the first group of data units and the second group of data units corresponding to the physical frames to be transmitted on the first channel 202 and the second channel 204. In some example embodiments, the offset information may include a super frame counter offset.

In some embodiments, the super frame counter offset may indicate the difference between the first counter associated with the downlink frame for the first channel 202 and the second counter associated with the downlink frame for the second channel 204. In other embodiments, the super frame counter offset may indicate the value of the first counter and the value of the second counter. In turn, the bundling way of the bundled XGEM frame in the corresponding PHY frame can be determined based on the value of the first counter and the second counter. In still other embodiments, the super frame counter offset may indicate the values of the first counter and the second counter at a predetermined time (for example, a specific ToD), and similarly, the bundling way of the bundled XGEM frame in the corresponding PHY frame can be determined based on the corresponding values of the first counter and the second counter at the predetermined time.

Figure 10:
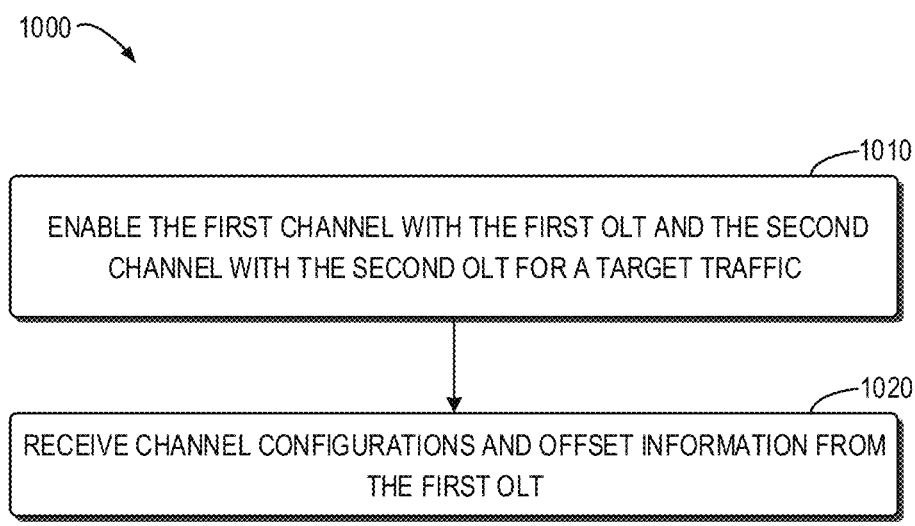
FIG. 10 illustrates a flowchart of a method according to an example embodiment of the present disclosure.

FIG. 10 illustrates a flowchart of a method 1000 according to certain embodiments of the present disclosure. The method 1000 may be implemented at an ONU in an optical network, for example, the ONU 210 shown in FIG. 2A and FIG. 2B, or may also be implemented using any suitable device. To facilitate discussion, the method 1000 will be described below in conjunction with FIG. 2A and FIG. 2B.

In an embodiment in which multi-wavelength channel bundling is initiated between the ONU 210 and the OLT 220, in addition to the existing first channel 202 used to transmit a target traffic, the second channel 204 with the second OLT 220-2 is also enabled for the target traffic. At 1010, the ONU 210 enables the first channel 202 with the first OLT 220-1 and the second channel 204 with the second OLT 220-2 for target traffic. In an example embodiment, the first channel 202 corresponds to the first wavelength $\lambda_1$, the second channel 204 corresponds to the second wavelength $\lambda_2$ which is different from the first wavelength $\lambda_1$.

In some example embodiments, the target traffic includes at least one of uplink traffic transmitted by the ONU 210 to the first OLT 220-1 and the second OLT 220-2 and downlink traffic received from the first OLT 220-1 and the second OLT 220-2.

At 1020, the ONU 210 receives channel configurations and offset information from the first OLT 220-1. In this example, the first OLT 220-1 is configured with a traffic scheduler for realizing global scheduling on the bundled channels. In some example embodiments, the channel configurations may indicate the channel identification associated with the first channel 202 and the second channel 204, and the offset information indicates the timing information of the first group of data units and the second group of data units corresponding to the physical frames to be transmitted on the first channel 202 and the second channel 204.

In some example embodiments, as one of the implementations of receiving the channel configurations and the offset information in 1020, the ONU 210 may receive the channel configurations from the first OLT 220-1 that includes the XGEM port numbers associated with the first channel 202 and the second channel 204. Based on the received channel configurations, the ONU 210 may associate the physical frames to be transmitted on the first channel 202 and the second channel 204 with the target traffic. After completing the configuration of the XGEM ports, the ONU 210 may transmit a successful configuration response for the channel configurations to the first OLT 220-1. Then, the ONU 210 may receive the offset information from the first OLT 220-1.

In some example embodiments, as one of the implementations of receiving the offset information in 1020, the ONU 210 may receive a super frame counter offset from the first OLT 220-1 through one of the OMCC and PLOAM messages. In some embodiments, the super frame counter offset may indicate the difference between the first counter associated with the downlink frame for the first channel 202 and the second counter associated with the downlink frame for the second channel 204. In other embodiments, the super frame counter offset may indicate the value of the first counter and the value of the second counter. In turn, the bundling way of the bundled XGEM frame in the corresponding PHY frame can be determined based on the value of the first counter and the second counter. In still other embodiments, the super frame counter offset may indicate the values of the first counter and the second counter at a predetermined time (for example, a specific ToD), and similarly, the bundling way of the bundled XGEM frame in the corresponding PHY frame can be determined based on the corresponding values of the first counter and the second counter at the predetermined time.

In some example embodiments, the ONU 210 may perform transmission of the physical frames corresponding to the first group of data units and the second group of data units on the first channel 202 and the second channel 204 based on the channel configurations and the offset information.

In an embodiment of downlink transmission, as one of the implementations for the transmission of the physical frames on the first channel 202 and the second channel 204, the ONU 210 may determine that the physical frame received from the first channel 202 correspond to the first group of data units and the physical frame received from the second channel 204 correspond to the second group of data units based on the channel configurations. For example, the ONU 210 may extract the first group of data units and the second group of data units from the physical frames received from the first channel 202 and the second channel 204 respectively. The ONU 210 may determine the timing sequence of the first group of data units and the second group of data units based on the offset information. The ONU 210 may then determine the SDU of the target traffic from the first group of data units and the second group of data units based on the determined timing sequence. For example, the ONU 210 may reassemble the first group of data units and the second group of data units based on the timing sequence to obtain the SDU of the target traffic.

In an embodiment of uplink transmission, as one of the implementations for the transmission of the physical frames on the first channel 202 and the second channel 204, the ONU 210 may divide the target traffic into a first group of data units and a second group of data units based on the channel configurations and offset information. The ONU 210 transmits the physical frame corresponding to the first group of data units to the first OLT 220-1 on the first channel 202, and transmits the physical frame corresponding to the second group of data units to the second OLT 220-2 on the second channel 204.

Figure 11:
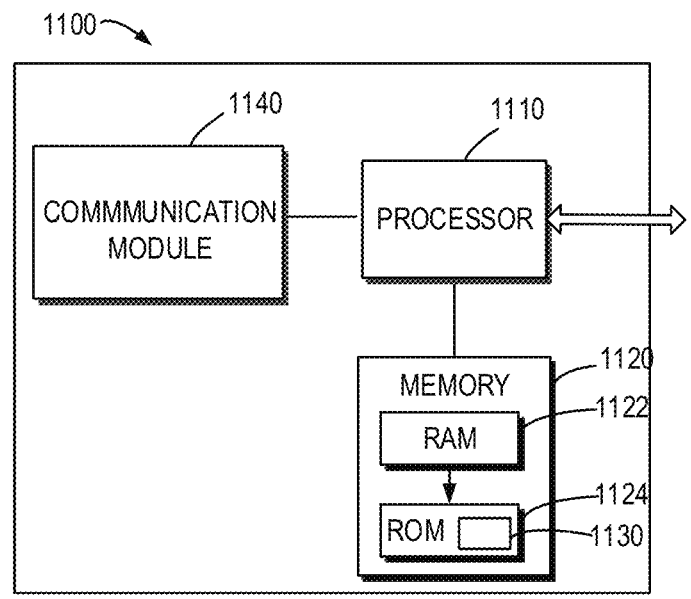
FIG. 11 illustrates a block diagram of a device suitable for implementing certain embodiments of the present disclosure.

FIG. 11 illustrates a block diagram of a device 1100 suitable for implementing an embodiment of the present disclosure. The device 1100 may be implemented at the ONU 210, the OLT 220, and the DBA 230 shown in FIGS. 2A and 2B or a part of the ONU 210, the OLT 220, and the DBA 230.

As shown in FIG. 11, the device 1100 includes a processor 1110. The processor 1110 controls the operations and functions of the device 1100. For example, in some embodiments, the processor 1110 may perform various operations by means of instructions 1130 stored in the memory 1120 coupled thereto. The memory 1120 may be of any suitable type suitable for the local technical environment, and may be implemented using any suitable data storage technology, including but not limited to, a semiconductor-based storage device, a magnetic storage device and system, and an optical storage device and system. Although only one memory unit is shown in FIG. 11, there may be multiple physically different memory units in the device 1100.

The processor 1110 may be of any suitable type suitable for the local technical environment, and may include, but not limited to, one or more of a general-purpose computer, a special-purpose computer, a microcontroller, a digital signal controller (DSP), and a controller-based multi-core controller model. The device 1100 may also include multiple processors 1110. The device 1100 may implement the reception and transmission of information in a wired manner by means of optical fibers or cables or in a wireless manner.

The processor 1110 causes the device 1100 to execute the related operations and features of the ONU 210, the OLT 220, and the DBA 230 described above with reference to FIGS. 3 to 10 by executing instructions. All the features described above with reference to FIGS. 3 to 10 are applicable to the device 1100, and will not be repeated here.

The memory 1120 may include one or more non-volatile memories and one or more volatile memories. Examples of the non-volatile memories include, but are not limited to, a read only memory (ROM) 1124, an electrically programmable read only memory (EPROM), a flash memory, a hard disk, a compact disc (CD), a digital video disk (DVD), and other magnetic storage and/or optical storage media. Examples of the volatile memories include, but not limited to, a random access memory (RAM) 1122 and other volatile memories that will not last in the power-down duration.

The computer program 1130 includes computer executable instructions that may be executed by the associated processor 1110. The program 1130 may be stored in the ROM 1124. The processor 1110 may perform any suitable actions and processing by loading the program 1130 into the RAM 1122.

The embodiments of the present disclosure may be implemented by means of the program 1130 so that the device 1100 may perform any process as discussed herein with reference to FIG. 8, FIG. 9 and FIG. 10. The embodiments of the present disclosure may also be implemented by hardware or by a combination of software and hardware.

Figure 12:
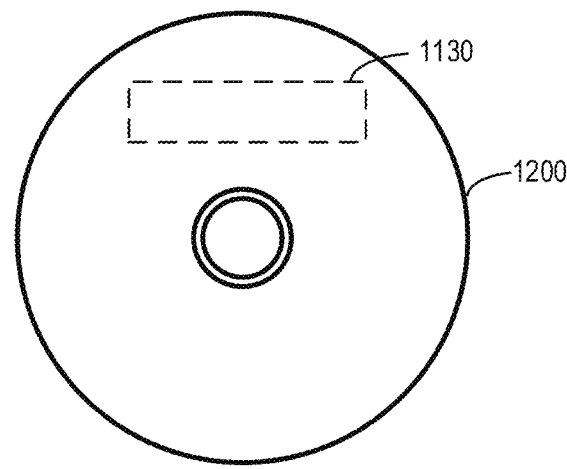
FIG. 12 illustrates a block diagram of an example computer readable medium according to some example embodiments of the present disclosure.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 illustrates an example of the computer readable medium 1200 in form of CD or DVD. The computer readable medium has the program 1130 stored thereon.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the embodiments of the present disclosure are illustrated and described as block diagrams, flowcharts, or using some other pictorial representations. It is to be understood that the block, device, system, technique or method described herein may be implemented in, as non-limiting examples, hardware, software, firmware, special purpose circuits or logic, general purpose hardware or controller or other computing devices, or some combination thereof.

As an example, the embodiments of the present disclosure may be described in the context of machine-executable instructions, such as included in program modules executed in devices on a target real or virtual processor. Generally, program modules includes routines, programs, libraries, objects, classes, components, data structures, or the like that perform particular tasks or implement particular abstract data types. In various embodiments, the functions of the program modules may be combined or split between program modules as described. The machine-executable instructions for program modules may be executed locally or within a distributed device. In a distributed device, program modules may be located in both local and remote storage media.

The computer program code for implementing methods of the present disclosure may be written in one or more programming languages. These computer program codes may be provided to a processor of a general purpose computer, a special purpose computer, or other programmable data processing apparatus, such that the program codes, when executed by the computer or other programmable data processing apparatus, cause the functions/operations specified in the flowcharts and/or block diagrams to be implemented. The program codes may be executed entirely on a machine, partly on the machine, as a stand-alone software package, partly on the machine and partly on a remote machine or entirely on the remote machine or server.

In the context of the present disclosure, the computer program codes or related data may be carried by any suitable carrier to enable a device, an apparatus or a processor to perform various processes and operations as described above. Examples of the carrier include a signal, computer readable medium, and the like.

Examples of the signal may include electrical, optical, radio, sound, or other forms of propagation signals, such as carrier waves, infrared signals, and the like.

The computer readable medium may be any tangible medium that contains or stores a program used in or related to an instruction execution system, apparatus, or device. The computer-readable medium may be a computer-readable signal medium or a computer-readable storage medium. A computer readable medium may include but not limited to, an electronic, magnetic, optical, electromagnetic, infrared, or semiconductor system, apparatus, or device, or any suitable combination of them. More specific examples of the computer readable storage medium include an electrical connection with one or more wires, a portable computer diskette, a hard disk, a random access memory (RAM), a read-only memory (ROM), an erasable programmable read-only memory (EPROM or Flash memory), an optical storage device, a magnetic storage device, or any suitable combination of them.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be beneficial. Likewise, while certain specific implementation details are contained in the above discussions, these should not be construed as limitation on the scope of the present disclosure, but rather as description of particular embodiments for particular inventions. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in languages specific to structural features and/or methodological acts, it is to be understood that the subject matter defined in the appended claims is not necessarily limited to the specific features or acts described above. Rather, the specific features and acts described above are disclosed as example forms of implementing the claims.

Various example embodiments of the present disclosure have been described. In addition to or as an alternative to the above, further embodiments are described. The features described in any of the examples can be used with any of other examples described herein.

What is claimed is:

1. A first optical line terminal (OLT) comprising:
at least one processor; and
at least one memory comprising computer program codes, the at least one memory and the computer program codes configured to, with the at least one processor, cause the first OLT to,
determine, in response to a first channel associated with the first OLT and a second channel associated with a second OLT being enabled for a target traffic, a traffic scheduler for scheduling the target traffic, the first channel corresponding to a first wavelength, the second channel corresponding to a second wavelength which is different from the first wavelength; and
transmit channel configurations and offset information to an optical network unit (ONU) based on scheduling of a first group of data units and a second group of data units of the target traffic by the traffic scheduler on the first channel and the second channel, respectively, the channel configurations indicating channel identifications associated with the first channel and the second channel, and the offset information indicating timing information of the first group of data units and the second group of data units corresponding to physical frames transmitted on the first channel and the second channel.

2. The first OLT of claim 1, wherein transmitting the channel configurations and the offset information to the ONU comprises:
transmitting the channel configurations to the ONU, the channel configurations comprising 10 Gigabit Passive Optical Network, XG-PON, encapsulating method, XGEM port numbers associated with the first channel and the second channel; and
transmitting the offset information to the ONU in response to receiving a successful configuration response for the channel configurations from the ONU;
wherein the transmitting the offset information to the ONU comprises,
transmitting a super frame counter offset to the ONU through one of an ONU management and control interface command and a physical layer operation, administration and maintenance message, the super frame counter offset indicating one of the following:
a difference between a first counter and a second counter associated with corresponding downlink frames for the first channel and the second channel,
a value of the first counter and a value of the second counter, and
values of the first counter and the second counter at a desired time.

3. The first OLT of claim 1, wherein the first OLT is further caused to:
perform transmission of the physical frame corresponding to the first group of data units with the ONU on the first channel based on the channel configurations and the offset information.

4. The first OLT of claim 1, wherein the target traffic comprises at least one of uplink traffic received from the ONU and downlink traffic transmitted to the ONU.

5. The first OLT of claim 1, wherein determining the traffic scheduler comprises:
determining a global dynamic bandwidth unit as the traffic scheduler, the global dynamic bandwidth unit being arranged outside of the first OLT and the second OLT and is configured to determine the scheduling of the target traffic based on scheduling status of the first channel and the second channel obtained from the first OLT and the second OLT.

6. The first OLT of claim 1, wherein determining the traffic scheduler comprises:
determining a first dynamic bandwidth unit configured on the first OLT as the traffic scheduler through negotiation with the second OLT; and
disabling a second dynamic bandwidth unit configured on the second OLT;
wherein the first OLT is further caused to,
transmit the offset information of the traffic scheduler to the second OLT, so that the second OLT performs transmission of the physical frame corresponding to the second group of data units with the ONU on the second channel based on the offset information.

7. The first OLT of claim 1, wherein the first OLT is further caused to:
transmit, to the ONU, the physical frame corresponding to the first group of data units on the first channel.

8. The first OLT of claim 1, wherein the first OLT is further caused to:
receive, from the ONU, the physical frame corresponding to the first group of data units on the first channel; and
obtain the first group of data units corresponding to the physical frame based on the channel configurations and the offset information.

9. The first OLT of claim 1, wherein the first OLT is further caused to:
transmit scheduling status of the first channel to the traffic scheduler, so that the traffic scheduler determines the scheduling of the target traffic on the first channel and the second channel.

10. A traffic scheduler, comprising:
at least one processor; and
at least one memory comprising computer program codes, the at least one memory and the computer program codes configured to, with the at least one processor, cause the traffic scheduler to,
obtain, in response to a first channel associated with a first optical line terminal (OLT) and a second channel associated with a second OLT being enabled for a target traffic, scheduling status of the first channel and the second channel from the first OLT and the second OLT, the first channel corresponding to a first wavelength, and the second channel corresponding to a second wavelength which is different from the first wavelength;
determine, based on the scheduling status, scheduling of a first group of data units and a second group of data units of the target traffic on the first channel and the second channel, respectively; and
indicate offset information to the first OLT and the second OLT, the offset information indicating timing information of the first group of data units and the second group of data units corresponding to physical frames transmitted on the first channel and the second channel.

11. The traffic scheduler of to claim 10, wherein the target traffic comprises at least one of uplink traffic transmitted from the ONU to the first OLT and the second OLT and downlink traffic transmitted from the first OLT and the second OLT to the ONU.

12. The traffic scheduler of claim 10, wherein the traffic scheduler comprises a global dynamic bandwidth device one of (i) arranged outside of the first OLT and the second OLT; or configured on one of the first OLT and the second OLT.

13. The traffic scheduler of claim 10, wherein the offset information comprises a super frame counter offset, the super frame counter offset indicating one of the following,
- a difference between a first counter and a second counter associated with corresponding downlink frames for the first channel and the second channel,
- a value of the first counter and a value of the second counter, and
- values of the first counter and the second counter at a desired time.

14. An optical network unit (ONU) comprising:
at least one processor; and
at least one memory comprising computer program codes, the at least one memory and the computer program codes are configured to, with the at least one processor, cause the ONU to:
- enable a first channel with a first optical line terminal (OLT) and a second channel with the second OLT for a target traffic, the first channel corresponding to a first wavelength, and the second channel corresponding to a second wavelength which is different from the first wavelength; and
- receive channel configurations and offset information from the first OLT, the channel configurations indicating channel identifications associated with the first channel and the second channel, and the offset information indicates timing information of a first group of data units and a second group of data units corresponding to physical frames transmitted on the first channel and the second channel.

15. The ONU of claim 14, wherein receiving the channel configurations and the offset information comprises:
- receiving the channel configurations from the first OLT, the channel configurations comprising 10 Gigabit Passive Optical Network, XG-PON, encapsulating method, XGEM, port numbers associated with the first channel and the second channel;
- associating physical frames to be transmitted on the first channel and the second channel with the target traffic based on the channel configurations;
- transmitting a successful configuration response for the channel configurations to the first OLT; and
- receiving the offset information from the first OLT.

16. The ONU of claim 15, wherein receiving the offset information comprises:
- receiving a super frame counter offset to the ONU through one of an ONU management and control interface command and a physical layer operation, administration and maintenance message, the super frame counter offset indicating one of the following,
  - a difference between a first counter and a second counter associated with corresponding downlink frames for the first channel and the second channel,
  - a value of the first counter and a value of the second counter, and
  - values of the first counter and the second counter at a predetermined time.

17. The ONU of claim 14, wherein the target traffic comprises at least one of uplink traffic transmitted to the first OLT and the second OLT and downlink traffic received from the first OLT and the second OLT.

18. The ONU of claim 14, wherein the ONU is further caused to:
- perform transmission of the physical frames corresponding to the first group of data units and the second group of data units on the first channel and the second channel based on the channel configurations and the offset information.

19. The ONU of claim 18, wherein performing the transmission of the physical frames on the first channel and the second channel comprises:
- determining, based on the channel configurations, that the physical frame received from the first channel corresponds to the first group of data units and the physical frame received from the second channel corresponds to the second group of data units;
- determining timing of the first group of data units and the second group of data units based on the offset information; and
- determining the target traffic from the first group of data units and the second group of data units based on the timing.

20. The ONU of claim 18, wherein performing the transmission of the physical frames on the first channel and the second channel comprises:
- dividing the target traffic into the first group of data units and the second group of data units based on the channel configurations and the offset information;
- transmitting, to the first OLT, the physical frame corresponding to the first group of data units on the first channel; and
- transmitting, to the second OLT, the physical frame corresponding to the second group of data units on the second channel.

* * * * *